United States Patent
Kokkonen et al.

(10) Patent No.: US 12,250,934 B2
(45) Date of Patent: Mar. 18, 2025

(54) FISHING BAIT, A MOULDABLE COMPOSITION FOR MANUFACTURING THE FISHING BAIT, A METHOD FOR MANUFACTURING THE FISHING BAIT AND A USE OF THE MOULDABLE COMPOSITION

(71) Applicant: KL-TEHO OY, Korpilahti (FI)

(72) Inventors: Jari Kokkonen, Kalliola (FI); Juha Siirtola, Vääksy (FI); Eberhard Dick, Neckargemünd (DE); Sonja Göttling, Heppenheim (DE); Sigrid Wirth, Neunkirchen (DE)

(73) Assignee: KL-TEHO OY, Korpilahti (FI)

( * ) Notice: Subject to any disclaimer, the term of this patent is extended or adjusted under 35 U.S.C. 154(b) by 443 days.

(21) Appl. No.: 17/431,638

(22) PCT Filed: Feb. 20, 2020

(86) PCT No.: PCT/FI2020/050105
§ 371 (c)(1),
(2) Date: Aug. 17, 2021

(87) PCT Pub. No.: WO2020/169885
PCT Pub. Date: Aug. 27, 2020

(65) Prior Publication Data
US 2022/0142131 A1   May 12, 2022

(30) Foreign Application Priority Data
Feb. 20, 2019 (EP) ..................................... 19158188

(51) Int. Cl.
*A01K 85/00* (2006.01)
*B29C 39/00* (2006.01)
(Continued)

(52) U.S. Cl.
CPC ............ *A01K 85/00* (2013.01); *B29C 39/003* (2013.01); *B29K 2005/00* (2013.01);
(Continued)

(58) Field of Classification Search
CPC ....................................................... A01K 85/00
See application file for complete search history.

(56) References Cited

U.S. PATENT DOCUMENTS 3,421,899 A * 1/1969 Humphreys ......... A01K 97/045
43/44.99
4,463,018 A * 7/1984 Carr ..................... A01K 97/045
426/805

(Continued)

FOREIGN PATENT DOCUMENTS

| CN | 101228855 | 7/2008 |
| CN | 101268812 | 9/2008 |

(Continued)

OTHER PUBLICATIONS

Zhang et al, Chemical Cross-Linking Gelatin with Natural Phenolic Compounds as Studied by High-Resolution NMR Spectroscopy, Biomacromolecules, 2010, 11, 1125-1132 (Year: 2010).*

(Continued)

*Primary Examiner* — Timothy Kennedy
(74) *Attorney, Agent, or Firm* — Nixon & Vanderhye, P.C.

(57) ABSTRACT

The present invention relates to a fishing bait, a mouldable composition for manufacturing the fishing bait, a method for manufacturing the fishing bait and a use of the mouldable composition. The mouldable composition comprises a basic solution comprising water, a gelling agent and a plasticizer. The mouldable composition further comprises at least one cross-linking agent in the volume of the basic solution.

19 Claims, 1 Drawing Sheet

(51) Int. Cl.
  *B29K 105/12* (2006.01)
  *B29K 105/24* (2006.01)
  *B29L 31/00* (2006.01)

(52) U.S. Cl.
  CPC ...... *B29K 2105/12* (2013.01); *B29K 2105/24* (2013.01); *B29K 2995/006* (2013.01); *B29L 2031/7002* (2013.01)

(56) References Cited

U.S. PATENT DOCUMENTS

| | | | | |
|---|---|---|---|---|
| 5,266,323 | A * | 11/1993 | Guthrie | C08G 18/4286 523/124 |
| 5,270,044 | A * | 12/1993 | Fulmer | A61L 31/06 523/124 |
| 5,549,921 | A * | 8/1996 | Robinson | A23L 29/284 426/573 |
| 5,922,379 | A * | 7/1999 | Wang | B29B 7/007 106/162.51 |
| 6,318,020 | B1 * | 11/2001 | Mefferd | A01K 85/01 43/42.32 |
| 6,455,083 | B1 * | 9/2002 | Wang | A23P 30/34 426/805 |
| 7,534,422 | B2 * | 5/2009 | Etayo Garralda | A01K 85/00 424/84 |
| 2004/0146541 | A1 | 7/2004 | Chen | |
| 2005/0120611 | A1 | 6/2005 | Shinmura et al. | |
| 2006/0008445 | A1 * | 1/2006 | Garralda | A01K 85/00 424/84 |
| 2007/0144054 | A1 * | 6/2007 | Warczok | A01K 85/01 43/42.24 |
| 2008/0190009 | A1 * | 8/2008 | Shelton | A01K 85/00 43/42 |
| 2008/0289245 | A1 * | 11/2008 | Yun | A23K 10/30 426/1 |
| 2009/0277071 | A1 * | 11/2009 | Harris, Jr. | A01K 85/16 43/42.32 |
| 2013/0101548 | A1 * | 4/2013 | Henry | A61L 27/26 435/395 |
| 2013/0118055 | A1 * | 5/2013 | Schoor | A01K 97/045 426/1 |
| 2014/0287123 | A1 | 9/2014 | Dick et al. | |
| 2015/0173334 | A1 * | 6/2015 | Sawyer | B29C 35/002 264/129 |
| 2015/0359226 | A1 * | 12/2015 | Brady | B29C 39/003 424/84 |
| 2018/0049419 | A1 | 2/2018 | Robertson et al. | |
| 2020/0229417 | A1 * | 7/2020 | Pearce | A01K 97/045 |

FOREIGN PATENT DOCUMENTS

| | | |
|---|---|---|
| CN | 103004717 | 4/2013 |
| CN | 105432577 | 3/2016 |
| CN | 106046722 | 10/2016 |
| GB | 1465276 | 2/1977 |
| GB | 2467199 | 7/2010 |
| JP | 52-112594 | 9/1977 |
| JP | 2000-060363 | 2/2000 |
| JP | 2002-084926 | 3/2002 |
| JP | 2002-223670 | 8/2002 |
| JP | 2002-315474 | 10/2002 |
| JP | 2004-201626 | 7/2004 |
| JP | 2008-022784 | 2/2008 |
| JP | 2009-529592 | 8/2009 |
| JP | 2011-103803 | 6/2011 |
| JP | 2011-525128 | 9/2011 |
| JP | 2015-500024 | 1/2015 |
| KR | 10-2011-0088314 | 8/2011 |
| KR | 2011-0088314 | 8/2011 |
| LU | 87750 A1 * | 2/1991 |
| RU | 2333668 | 9/2008 |
| RU | 2573324 | 1/2016 |
| WO | 02/063952 | 8/2002 |
| WO | 02/071867 | 9/2002 |
| WO | 03/020049 | 3/2003 |
| WO | 2009/153750 | 12/2009 |
| WO | 2010/089104 | 8/2010 |
| WO | 2012/034707 | 3/2012 |
| WO | WO-2012034707 A1 * | 3/2012 ............ A01K 85/00 |
| WO | 2012/163937 | 12/2012 |
| WO | 2015/118421 | 8/2015 |

OTHER PUBLICATIONS

English machine translation of LU 87750, retrieved Jan. 18, 2024 (Year: 2024).*
English machine translation of WO 2012034707, retrieved Jan. 18, 2024 (Year: 2024).*
Kozlov et al, The structure and properties of solid gelatin and the principles of their modification, Polymer, 1983, vol. 24, June, pp. 651-666 (Year: 1983).*
Decision of Rejection issued Dec. 9, 2022 in corresponding Japanese Application No. 2021-547319 (with translation), 6 pages.
International Search Report for PCT/FI2020/050105, mailed May 15, 2020, 7 pages.
Written Opinion of the ISA for PCT/FI2020/050105, mailed May 15, 2020, 6 pages.
Extended Search Report for EP19158188.3, dated Aug. 21, 2019, 8 pages.
International Preliminary Report on Patentability with Amended Claims, for PCT/FI2020/050105, mailed May 17, 2021, 10 pages.
Rasim Alper Oral, "New Perspectives for the Encapsulation of Hydrophilic Compounds: Encapsulation of Hydrophilic Compounds", Journal of Food Processing and Preservation, vol. 41, No. 1, Feb. 1, 2017, 8 pages.
Office Action issued on Oct. 13, 2022 in corresponding Chinese Application No. 202080013704.6 (with translation), 16 pages.
Office Action issued on Feb. 24, 2022 in corresponding Chinese Application No. 202080013704.6 (with translation), 17 pages.
Office Action and Search Report issued on Apr. 13, 2022 in corresponding Russian Application No. 2021124962, 9 pages.
Extended European Search Report issued on Nov. 8, 2022 in corresponding European Application No. 20760045.3, 5 pages.
Office Action issued on Aug. 2, 2022 in corresponding Japanese Application No. 2021-547319, 7 pages.
Aug. 16, 2024 Office Action issued in Japanese Patent Application No. 2023-5708, pp. 1-22 [machine translation included].

* cited by examiner

FISHING BAIT, A MOULDABLE COMPOSITION FOR MANUFACTURING THE FISHING BAIT, A METHOD FOR MANUFACTURING THE FISHING BAIT AND A USE OF THE MOULDABLE COMPOSITION

This application is the U.S. national phase of International Application No. PCT/FI2020/050105 filed 20 Feb. 2020, which designated the U.S. and claims priority to EP patent application Ser. No. 19/158,188.3 filed 20 Feb. 2019, the entire contents of each of which are hereby incorporated by reference.

FIELD OF THE INVENTION

The present invention relates to a fishing bait, a mouldable composition for manufacturing the fishing bait, a method for manufacturing the fishing bait and a use of the mouldable composition.

BACKGROUND OF THE INVENTION

Artificial soft fishing baits are often manufactured of polyvinylchloride (PVC). Those kind of fishing baits are not biodegradable and thus, they may be harmful to the environment.

Biodegradable baits often degrade easily and become useless too early. Further, their properties are far from the optimum.

BRIEF DESCRIPTION OF THE INVENTION

An object of the present invention is to provide a fishing bait, a mouldable composition for manufacturing the fishing bait, a method for manufacturing the fishing bait and a use of the mouldable composition so as to solve the above problems. The objects of the invention are achieved by a fishing bait, a mouldable composition for manufacturing the fishing bait, a method for manufacturing the fishing bait and a use of the mouldable composition, which are characterized by what is stated in the independent claims. The preferred embodiments of the invention are disclosed in the dependent claims.

The present fishing bait is biodegradable and durable in use.

The present fishing bait provides several advantages. The fishing bait can be used in the same manner as existing polyvinylchloride (PVC) soft baits. The fishing bait works as a natural bait in all kinds of fishing including sport fishing and commercial fishing. The material of the fishing bait is harmless for fishes, users of the fishing bait and the environment, i.e. the material is ecological and safe. The material degrades in water into harmless ingredients. The degradation takes place both in fresh and salt water. The material is also compostable.

The material is convenient to handle, i.e. it is not sticky, slimy, messy or stinky. The fishing bait may be clear and transparent if desired. When the material of the fishing bait gets wet in water, i.e. it absorbs water, the fishing bait becomes extremely responsive to movements and vibrates easily, i.e. the fishing bait moves much and with ease.

The dissolving speed of the material in water as well as density, softness and elongation of the material can be controlled and adjusted by recipes. Scent, flavour and colour release can be controlled at the same time. The material may be aerated or foamed in order to enhance buoyancy of the fishing bait.

In addition to the flavours and scents, which are added to the fishing bait during manufacturing, flavours and scents can be added during the use as the material absorbs liquids.

The production process is sustainable since it produces insignificant amount of waste and it is cost efficient. The fishing baits may be injected directly to final retail packages. Further, the production process allows to combine different densities, colours and flavours in the same product.

Certain terms are used in this description:

A mouldable composition means that it can be moulded by pouring into a mould. The mould is let to stand until the mouldable composition is solidified. The mould may an open mould or a closed mould.

A plasticizer means a component, which increases flexibility and softness of the fishing bait. Water is excluded because it is used in any case as a component of the mouldable composition.

An additive for attracting fishes means any component that may attract fish. The additive may be visual attractant, such as a colour, a flavour, or a scent, such as an aroma of a food that fishes eat, or a pheromone.

A cross-linking agent means an agent that is selected so that it has a capability of cross-linking a specific gelling agent. The cross-linking agent increases the strength of the fishing bait and gives to the fishing bait predictable degradation properties that are adjustable according to a need by varying the amount of the cross-linking agent (i.e. adjusting the degree of crosslinking) and/or changing the cross-linking agent itself.

A fishing bait means a bait that is used to catch fishes, crustaceans, such as crabs, or molluscs, such as octopuses. The main use is to catch fishes.

In order to manufacture a fishing bait a mouldable composition is made first. The mouldable composition comprises a basic solution comprising water, a gelling agent and a plasticizer. The gelling agent may be a gelling agent comprising protein or a gelling agent comprising polysaccharides. The gelling agent may comprise animal derived constituents or plant derived constituents. The animal derived constituents comprise, for example, gelatine and collagen. The plant derived constituents comprise, for example, pectin and agar. Gelatine and collagen belong to protein comprising constituents. Pectin and agar belong to polysaccharide comprising constituents. The preferred gelling agent is gelatine but other gelling agents may be used alone or in addition to gelatine.

Any gelatine may be used but preferred choices are fast setting gelatines whose mean molecular weight is at least 120 kDa. The mean molecular weight may be at least 130 kDa or at least 140 kDa. The mean molecular weight is determined by gel chromatography. The above mentioned gelatine may have a proportion which has a molecular weight of more than 100 kDa, the proportion being at least 35 wt.-% of the total amount of gelatine. Such gelatines can be obtained from various collagen-containing materials, in particular from connective tissue or bones of pigs, cattle, poultry or fish.

In addition to water and a gelling agent, the basic solution comprises a plasticizer, which increases flexibility and softness of the fishing bait. The plasticizer may be sugar alcohol, such as sorbitol, mannitol, xylitol, erythritol, or glycerol. A preferred sugar alcohol is glycerol. The sugar alcohols contribute to the favourable rheological properties of the moulding composition.

The gelling agent, such as gelatine, is dissolved in water and the plasticizer, such as sugar alcohol, is added. Glucose syrup may also be added.

The basic solution may comprise 5 to 50 wt.-% of gelatine, 5 to 50 wt. % of water and 15 to 60 wt.-% of sugar alcohol. The basic solution may comprise 0 to 50 wt.-% of glucose syrup, i.e. it is also possible that the basic solution does not contain glucose syrup. The glucose syrup is preferably a highly hydrolysed glucose syrup with a dextrose equivalent of 50 or more, preferably of 60 or more.

According to one embodiment, the basic solution may comprise 10 to 15 wt.-% of gelatine, 30 to 35 wt.-% of water, 10 to 15 wt.-% of glucose syrup and 35 to 45 wt.-% of sugar alcohol, such as glycerol.

According to another embodiment, the basic solution may comprise 25 to 30 wt.-% of gelatine, 25 to 30 wt.-% of water, 20 to 25 wt.-% of glucose syrup and 20 to 25 wt.-% of sugar alcohol, such as glycerol.

According to still another embodiment, the basic solution may comprise 10 to 15 wt.-% of gelatine, 30 to 35 wt.-% of water and 50 to 55 wt.-% of sugar alcohol, such as glycerol.

According to still another embodiment, the basic solution may comprise 25 to 35 wt.-% of gelatine, 30 to 40 wt.-% of water and 30 to 40 wt.-% of sugar alcohol, such as glycerol.

The basic solution of the mouldable composition is prepared first. The gelatine component is dissolved in hot water having a temperature of about 70 to 80° C. Then a plasticizer, such as sugar alcohol, e.g. glycerol, and glucose syrup, if it is in the particular recipe, are added. A salt component may also be added to the basic solution. The salt component may comprise one salt or a mixture of different salts. The salt component may also comprise auxiliary agents.

The basic solution is boiled, preferably using slight overpressure, and thereafter treated under negative pressure in such a manner that water evaporates. The dry matter content of the basic solution can be adjusted by the evaporation.

After the basic solution has the targeted solids content at least one additive for attracting fishes may be added. The additive for attracting fishes may be a visual attractant, such as a colour, a flavour, or a scent, such as an aroma of a food that fishes eat. Suitable flavour- or scent-based attractants are, for example, fish oil, fish meal, molluscs (such as mussels) and jointed-legged animals (such as crustaceans). If necessary the attractants may be ground or crushed in such a manner that they are suitable for use in the fishing baits. Suitable visible attractants are, for example, colours and glitters that may be biodegradable. In addition to the additives for attracting fishes the additives may comprise, for example, pH regulating substances or preservatives, such as salt or acid.

A cross-linking agent is also added to the basic solution in order to form the mouldable composition. The cross-linking agent is selected so that it has a capability of cross-linking the specific gelling agent. Preferred cross-linking agents are cross-linkers that are found in nature or their synthetic equals. Suitable cross-linking agents are plant-derived cross-linking agents, such as plant-derived polyphenols or extracts comprising plant-derived polyphenols. Plant-derived polyphenols comprise, for example, oleuropein, tannic acid, gallic acid and hydroxycinnamic acids. Hydrocinnamic acids comprise caffeic acid, caftaric acid and ferulic acid. The extracts comprising plant-derived polyphenols comprise e.g. olive leaf extracts, coffee and grape juice.

According to one embodiment, a plant derived cross-linking agent is used. A plant derived polyphenol or an extract comprising plant-derived polyphenols, such as an olive leaf extract, is used as a cross-linking agent in a moulding composition comprising a basic solution comprising gelatine, water and sugar alcohol, such as glycerol. In addition to the basic solution and the cross-linking agent the moulding composition comprises at least one attractant for attracting fishes. Gelatine may be a fast setting gelatine having a mean molecular weight of at least 120 kDa, preferably at least 130 kDa and more preferably 140 kDa. The moulding composition may comprise biodegradable fibers.

Generally, the cross-linking agent may be selected among non-toxic cross-linkers, which are capable of cross-linking the specific gelling agent. The cross-linking agent may belong to aldehydes, dialdehydes, isocyanates, diisocyanates, carbodiimides and alkyl dihalides.

The cross-linking agent may have a dual role in the mouldable composition. In addition to the cross-linking property the cross-linking agent may act as an additive for attracting fishes. For example, the cross-linking agent may have a bright colour that attracts fishes.

The mouldable composition may comprise biodegradable fibers, which may belong to natural fibers, man made fibers or regenerated fibers. The fibers may be of e.g. cellulose, regenerated cellulose, polyvinyl alcohol (PVOH) or polylactic acid (PLA). The fibers give extra strength to the fishing bait. They also fine-tune the texture of the fishing bait. The properties of the fibers, e.g. their length, are selected so that they are compatible with the other components of the fishing bait. The distribution of the fibers into the mouldable composition may be an important factor. The length of the fibers may be at the most 2 mm. The fibers may be fine and flexible. Their share in the mouldable composition may be at the most 2 wt.-%.

The basic solution, the additives and the cross-linking agent form the mouldable composition. pH of the mouldable composition is preferably around 5.5, i.e. pH shall be slightly acidic. The mouldable composition is moulded to fishing baits by pouring the composition into casting moulds. The temperature of the moulding composition is preferably at least 80° C. when it is moulded. The casting moulds may be separate moulds, or they may be a part of sales packages, i.e. the fishing baits are directly moulded to a tray, which forms a part of the sales package. The fishing bait may resemble e.g. a small fish, a worm or some other aquatic animal which certain fish species eat.

In addition to the above-mentioned components the mouldable composition may comprise lubricating agents. A lubricating agent may comprise long-chain fatty acids and/or long-chain alcohols. Another lubricating agent may comprise, for example, erucamide, oleamide, stearamide, or behenamide. Still another lubricating agent may be a vegetable-based wax whose melting point is below 100° C.

The mouldable composition may also contain particles whose aim may be to adjust the weight and/or the set of the bait and/or the solubility of the bait. Such particles include e.g. nanoclays which are nanoparticles of clay minerals, such as montmorillonite, bentonite, kaolinite, hectorite, and halloysite.

The fishing baits starts to cool in the casting mould. At the same time the material of the fishing baits begins to cross-link. The material may be solid enough shortly after moulding.

The physical properties of the fishing baits can be adjusted by the cross-linking agent. The amount and the properties of the specific cross-linking agent has an effect on the physical properties of the fishing baits. As the crosslinking agent is spread through the whole volume of the basic solution the fishing bait has stabile properties throughout its volume and therefore, it has predictable degradation properties. The degradation properties can be adjusted by the selection of the cross-linking agent and its amount. In connection with gelatine, it is possible to use other gelatines instead of the fast setting gelatines since the crosslinking agent assists in solidifying gelatine.

The end product, i.e. the bait, has 65 to 95 wt.-% of dry matter and 5 to 35 wt.-% of water. Preferably the end product has 85 to 90 wt.-% of dry matter and 10 to 15 wt.-% of water. The low water content enhances the shelf-life of the fishing bait and it makes possible to use the closed moulds because there is no need for evaporation from the moulds. The closed moulds are advantageous because they enable complete three-dimensional shapes of the fishing baits.

DETAILED DESCRIPTION OF THE INVENTION

Figure 1A:
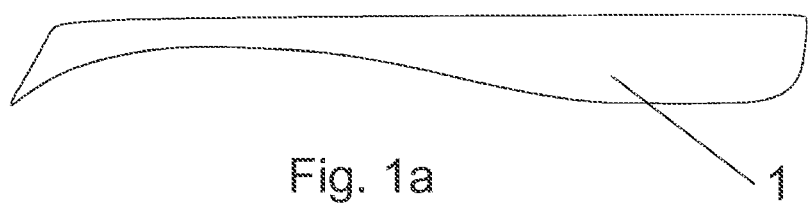
FIG. 1a shows an example of a fishing bait.
Figure 1B:
FIG. 1b shows a hook.
Figure 1C:
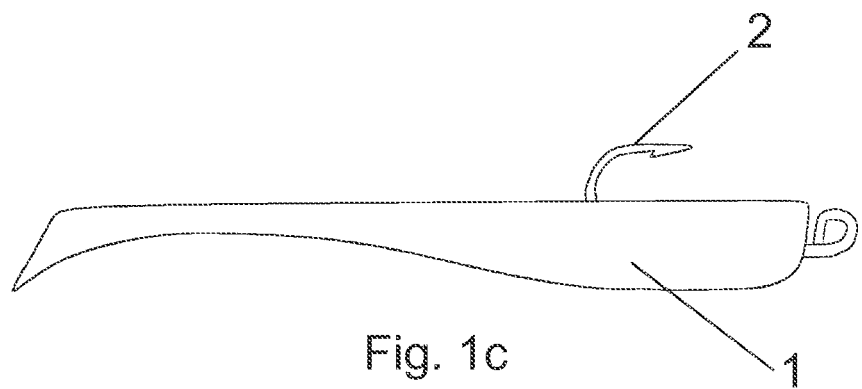
FIG. 1c shows the fishing bait of FIG. 1a impaled by the hook of FIG. 1b.

FIG. 1a shows an example of a fishing bait 1. The fishing bait 1 may have a shape of a fish as shown in FIG. 1a. The shape may attract predatory fishes. FIG. 1b shows a fishing hook 2 which may be e.g. a hook attached to a line of a fishing rod. The fishing bait 1 is impaled by the hook 2 in FIG. 1c.

Samples of fishing baits were manufactured. The fishing baits were evaluated by testing the following features:
A. how soft the material is
B. how well the material stretches before it breaks
C. how well the material lasts rigging with a hook and use thereafter
D. how well the material holds on the hook
E. how well the material stands a water bath of two hours and 12 hours dry air thereafter Marks 1 (bad) to 10 (good) were given to the samples. Target marks were from 7 (min) to 10 (max).

A mixture comprising additives for attracting fishes and a crosslinking agent was prepared. The cross-linking agent was an olive leaf extract and its amount in the mixture was 20 wt.-%.

Example 1

A basic solution comprising 26.1 kg gelatine having a gel strength of 280 g (280 Bloom), 63.9 kg water, 26.3 kg corn syrup and 78.8 kg glycerol was boiled. Water was evaporated in a vacuum chamber having negative pressure of −0.6 bar to −0.33 bar and temperature of 92.5° C. to 99.5° C. in such a manner that the total solids content of 80 wt.-% was reached. The mixture comprising additives for attracting fishes and the cross-linking agent was added to the basic solution in order to form a mouldable composition. The amount of the mixture was 9 wt.-% of the total mass of the mouldable composition. The mouldable composition was poured into oiled moulds to form fishing baits.

The following results were achieved:
A. 9
B. 7
C. 7
D. 9
E. 5

Example 2

A basic solution comprising 62.2 kg gelatine having a gel strength of 280 g (280 Bloom), 62.2 kg water, 53.7 kg corn syrup and 53.7 kg glycerol was boiled. Water was evaporated in a vacuum chamber having negative pressure of −0.6 bar to −0.33 bar and temperature of 92.5° C. to 99.5° C. in such a manner that the total solids content of 80 wt.-% was reached. The mixture comprising additives for attracting fishes and the cross-linking agent was added to the basic solution in order to form a mouldable composition. The amount of the mixture was 9 wt.-% of the total mass of the mouldable composition. The mouldable composition was poured into oiled moulds to form fishing baits.

The following results were achieved:
A. 9
B. 7
C. 8
D. 9
E. 6

Example 3

A basic solution comprising 26.5 kg gelatine having a gel strength of 280 g (280 Bloom), 65 kg water and 103.5 kg glycerol was boiled. Water was evaporated in a vacuum chamber having negative pressure of −0.6 bar and temperature of 92° C. to 96° C. in such a manner that the total solids content of 80 wt.-% was reached. The mixture comprising additives for attracting fishes and the cross-linking agent was added to the basic solution in order to form a mouldable composition. The amount of the mixture was 9 wt.-% of the total mass of the mouldable composition. The mouldable composition was poured into oiled moulds to form fishing baits.

The following results were achieved:
A. 9
B. 9
C. 9
D. 9
E. 6-7

Example 4

A basic solution comprising 30 kg gelatine having a gel strength of 300 g (300 Bloom), 35 kg water and 35 kg glycerol was boiled. Water was evaporated in a vacuum chamber in such a manner that the total solids content of 80 wt.-% was reached. The mixture comprising additives for attracting fishes and the crosslinking agent was added to the basic solution in order to form a mouldable composition. The amount of the mixture was 9 wt.-% of the total mass of the mouldable composition. The mouldable composition was poured into oiled moulds to form fishing baits.

The following results were achieved:
A. 9
B. 9
C. 9
D. 9
E. 7

It will be obvious to a person skilled in the art that, as the technology advances, the inventive concept can be implemented in various ways. The invention and its embodiments are not limited to the examples described above but may vary within the scope of the claims.

The invention claimed is:

1. A fishing bait comprising a cross-linked and moulded composition having water, gelatine, sugar alcohol, and at least one cross-linking agent, wherein the moulded composition has a water content of 10 to 15 wt.-%.

2. The fishing bait according to claim 1, wherein the moulded composition comprises glucose syrup.

3. The fishing bait according to claim 1, wherein gelatine has a mean molecular weight of at least 120 kDa.

4. The fishing bait according to claim 1, wherein the cross-linking agent comprises a plant-derived polyphenol.

5. The fishing bait according to claim 1, wherein the fishing bait comprises at least one lubricating agent.

6. The fishing bait according to claim 1, wherein the fishing bait comprises nanoclay.

7. The fishing bait according to claim 4, wherein the cross-linking agent comprises an oleuropein comprising cross-linking agent.

8. The fishing bait according to claim 4, wherein the cross-linking agent comprises an olive leaf extract.

9. A fishing bait comprising a cross-linked and moulded composition having water, gelatine, sugar alcohol, and at least one cross-linking agent comprising a plant derived polyphenol, wherein the moulded composition has a water content of 5 to 35 wt.-%.

10. The fishing bait according to claim 9, wherein the moulded composition comprises glucose syrup.

11. The fishing bait according to claim 9, wherein gelatine has a mean molecular weight of at least 120 kDa.

12. The fishing bait according to claim 9, wherein the cross-linking agent comprises an oleuropein comprising cross-linking agent.

13. The fishing bait according to claim 9, wherein the cross-linking agent comprises an olive leaf extract.

14. The fishing bait according to any preceding claim 9, wherein the fishing bait comprises at least one lubricating agent.

15. The fishing bait according to any preceding claim 9, wherein the fishing bait comprises nanoclay.

16. The fishing bait according to claim 1, wherein gelatine has a mean molecular weight of at least 130 kDa.

17. The fishing bait according to claim 1, wherein gelatine has a mean molecular weight of at least 140 kDa.

18. The fishing bait according to claim 9, wherein gelatine has a mean molecular weight of at least 130 kDa.

19. The fishing bait according to claim 9, wherein gelatine has a mean molecular weight of at least 140 kDa.

* * * * *